(12) United States Patent
Lussier et al.

(10) Patent No.: US 11,168,635 B2
(45) Date of Patent: Nov. 9, 2021

(54) METHODS AND SYSTEMS FOR ASSESSING ENGINE HEALTH

(71) Applicant: PRATT & WHITNEY CANADA CORP., Longueuil (CA)

(72) Inventors: Alexandre Lussier, Sainte-Julie (CA); Ioan Sabau, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 42 days.

(21) Appl. No.: 16/832,026

(22) Filed: Mar. 27, 2020

(65) Prior Publication Data

US 2021/0301749 A1 Sep. 30, 2021

(51) Int. Cl.
*F02D 41/22* (2006.01)
*F02D 41/14* (2006.01)

(52) U.S. Cl.
CPC ......... *F02D 41/22* (2013.01); *F02D 41/1497* (2013.01); *F02D 2041/224* (2013.01); *F05D 2220/36* (2013.01); *F05D 2260/80* (2013.01); *F05D 2270/301* (2013.01); *F05D 2270/304* (2013.01)

(58) Field of Classification Search
CPC ................. F02D 41/22; F02D 41/1497; F02D 2041/224; F05D 2260/80; F05D 2220/36; F05D 2270/304; F05D 2270/301
See application file for complete search history.

(56) References Cited

U.S. PATENT DOCUMENTS

| | | | |
|---|---|---|---|
| 6,293,085 B2* | 9/2001 | Thompson | F01D 21/045 60/773 |
| 9,134,198 B2* | 9/2015 | Djelassi | F01D 21/02 |
| 10,371,002 B2* | 8/2019 | Descamps | F01D 21/06 |
| 2016/0123180 A1 | 5/2016 | Otto | |

* cited by examiner

*Primary Examiner* — Sizo B Vilakazi
(74) *Attorney, Agent, or Firm* — Norton Rose Fulbright Canada LLP

(57) ABSTRACT

The present disclosure provides methods and systems for assessing a health state of an engine. During a fuel control failure event experienced by the engine, pressure data indicative of a pressure within a fuel combustor of the engine and acceleration data indicative of an acceleration of a shaft of the engine are obtained. The pressure data and acceleration data are compared to a predetermined limit associated with plastic deformation of the shaft of the engine. A maintenance issue for the engine is detected when the pressure data and the acceleration data are beyond the predetermined limit. An alert associated with a negative health state for the engine is issued responsive to detecting the maintenance issue.

20 Claims, 4 Drawing Sheets

METHODS AND SYSTEMS FOR ASSESSING ENGINE HEALTH

TECHNICAL FIELD

The application relates generally to combustion engines, and more specifically to assessing the health of combustion engines.

BACKGROUND OF THE ART

In a gas turbine engine, continuous inlet air is compressed, mixed with fuel in an inflammable proportion, and exposed to an ignition source to ignite the mixture which then continues to burn to produce combustion products. The combustion of the air-fuel mixture can be used to power various mechanical components, which in turn can be used to produce thrust.

It is known to monitor health parameters for engines, and existing approaches for evaluating health parameters for engines are suitable for their purposes. However, improvements are always desirable.

As such, there is room for improvement.

SUMMARY

In accordance with a broad aspect, there is provided method for assessing a health state of an engine. During a fuel control failure event experienced by the engine, pressure data indicative of a pressure within a fuel combustor of the engine and acceleration data indicative of an acceleration of a shaft of the engine are obtained. The pressure data and acceleration data are compared to a predetermined limit associated with plastic deformation of the shaft of the engine. A maintenance issue for the engine is detected when the pressure data and the acceleration data are beyond the predetermined limit. An alert associated with a negative health state for the engine is issued responsive to detecting the maintenance issue.

In accordance with another broad aspect, there is provided a system for assessing plastic deformation of a shaft of an engine. The system comprise a processing unit, and a non-transitory computer-readable medium having stored thereon computer-readable instructions. The computer-readable instructions are executable by the processing unit for: obtaining, during a fuel control failure event experienced by the engine, pressure data indicative of a pressure within a fuel combustor of the engine and acceleration data indicative of an acceleration of a shaft of the engine; comparing the pressure data and acceleration data to a predetermined limit associated with plastic deformation of the shaft of the engine; detecting a maintenance issue for the engine when the pressure data and the acceleration data are beyond the predetermined limit; and issuing an alert associated with a negative health state for the engine responsive to detecting the maintenance issue.

Features of the systems, devices, and methods described herein may be used in various combinations, in accordance with the embodiments described herein. In particular, any of the above features may be used alone, together in any suitable combination, and/or in a variety of arrangements, as appropriate.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
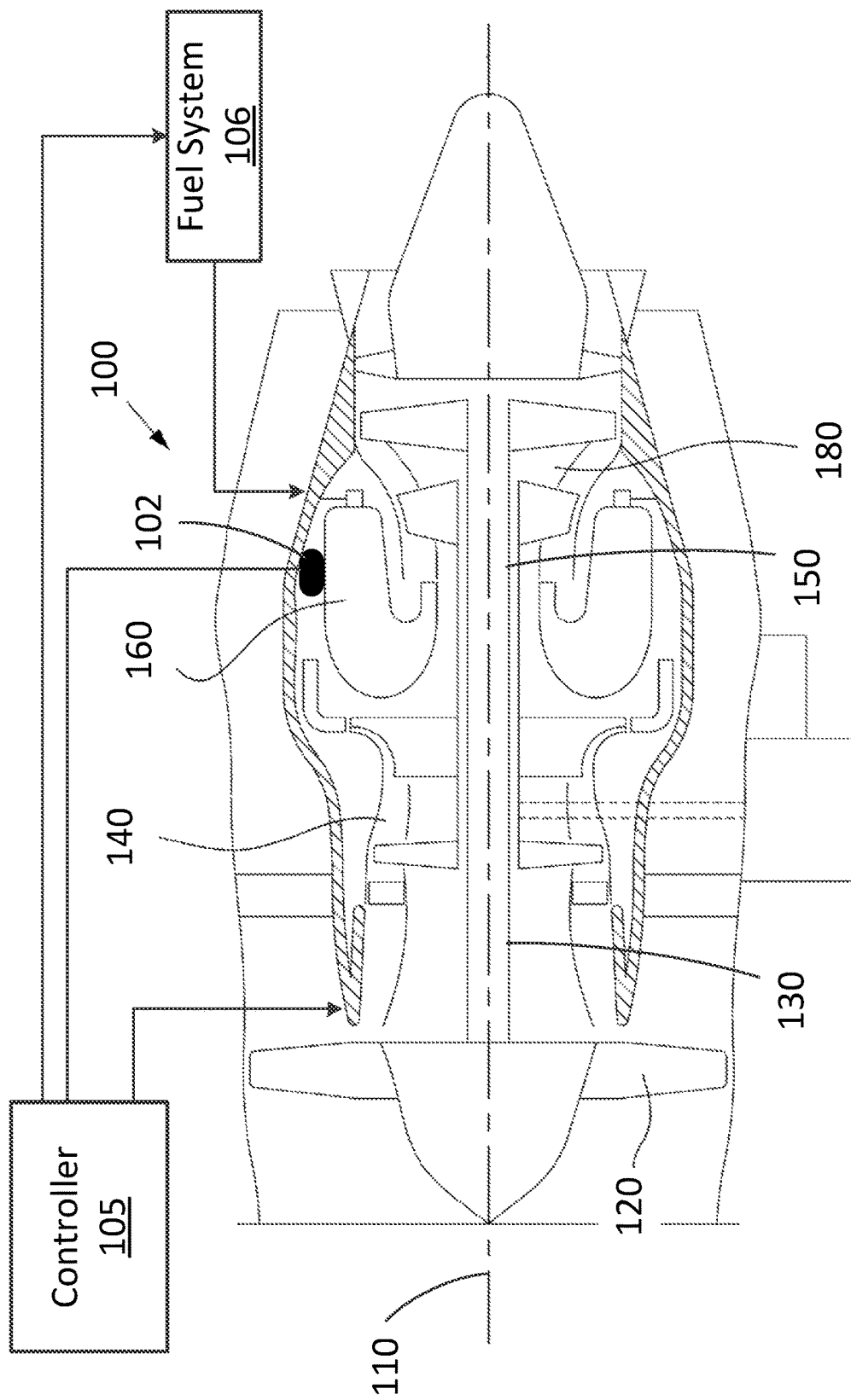
FIG. 1 is a schematic cross-sectional view of an example gas turbine engine.

With reference to FIG. 1, there is illustrated a gas turbine engine 100. Note that while engine 100 is a turbofan engine, the methods and systems described herein may be applicable to turboprop, turboshaft, and other types of gas turbine engines, or combustion engines generally. In addition, the engine 100 may be an auxiliary power unit (APU), an auxiliary power supply (APS), or any other suitable type of engine. In addition, although the foregoing discussion relates to a singular engine 100, it should be understood that the techniques described herein can be applied substantially concurrently to multiple engines.

The engine 100 generally comprises in serial flow communication: a fan 120 through which ambient air is propelled, a compressor section 140 for pressurizing the air, a combustor 160 in which the compressed air is mixed with fuel and ignited for generating a stream of hot combustion gases, and a turbine section 180 for extracting energy from the combustion gases. Axis 110 defines an axial direction of the engine 100. In some embodiments, a low pressure spool is composed of a low pressure shaft 130 and a low pressure turbine. The low pressure shaft 130 drives a rotating element, for instance a fan 120, though in other embodiments the rotating element can be a propeller or other device. A high pressure spool is composed of a high pressure turbine attached to a high pressure shaft 150, which is connected to the compressor section 140. It should be noted that other configurations for the engine 100 are also considered.

Control of the operation of the engine 100 can be effected by one or more control systems, for example a controller 105, and the engine 100 is supplied with fuel by a fuel system 106. The controller 105 can modulate a fuel flow rate provided to the engine 100, the position and/or orientation of variable geometry mechanisms within the engine 100, a bleed level of the engine 100, and the like. In order to perform control of the engine 100, the controller 105 can obtain information about the operating parameters of the engine 100 via one or more sensors 102. Sensors 102 can be distributed throughout the engine 100 at any suitable locations, and can provide the controller 105 with any suitable information.

The fuel system 106 can be provided with any suitable implements for supplying fuel to the engine 100, including pumps, valves, and the like. In operation, the fuel system 106 can be controlled by the controller 105, as described hereinabove. In certain situations, it can occur that the controller 105 becomes unable to control the fuel system 106. These situations are sometimes called "fuel runaway events", and can occur due to failure of the fuel system 106, of one or more components of the engine 100, and/or due to failure of the controller 105.

In some embodiments, when fuel runaway events occur, the controller 105 issues an alert to a maintenance crew or other staff to indicate that maintenance should be performed on at least the fuel system 106. However, it can occur that damage to one or more portions of the engine 100 beyond the fuel system 106 happens during fuel runaway events. For example, a fuel runaway event can result in certain elements within the engine 100 experiencing a plastic deformation event, including the low pressure shaft 130 and/or the high pressure shaft 150. The present disclosure provides, inter alia, methods and systems for assessing a health state of an engine, for instance the engine 100, and in some embodiments provides methods and systems for detecting a maintenance issue associated with an occurrence of a possible plastic deformation event of a shaft of the engine 100.

For example, depending on the size, shape, and material composition of the low pressure shaft 130, operating at a high rotational speed and/or at high temperatures can result in the low pressure shaft 130 experiencing a plastic deformation event, in which part or all of the low pressure shaft 130 is plastically deformed. As used herein, the term "plastic deformation" refers to any type of permanent distortion or alteration to a material due to forces or stresses placed on the material, including tensile, compressive, torsion, and/or bending stresses which exceed a yield strength for the material. In some cases, the distortion can include one or more of buckling, bending, twisting, elongation, compression, and the like. It should be noted that synonyms for plastic deformation exist, including inelastic deformation, and the like.

In some cases, if the low pressure shaft 130 experiences a plastic deformation event, continued use of the engine 100 without maintenance could pose a hazard. For instance, a low pressure shaft 130 having experienced a plastic deformation event could rotate incorrectly within the engine 100, causing damage to other components therein. As a result, detection of operating parameters for the engine 100 which may have resulted in a plastic deformation event may assist in properly assessing a health state for the engine 100. It should be noted that although the present discussion focuses primarily on plastic deformation events experienced by the low pressure shaft 130, the methods and systems described herein are also applicable to other shafts within the engine 100, including the high pressure shaft 150, and/or to other rotor shafts in other embodiments of the engine 100, as applicable.

Figure 2:
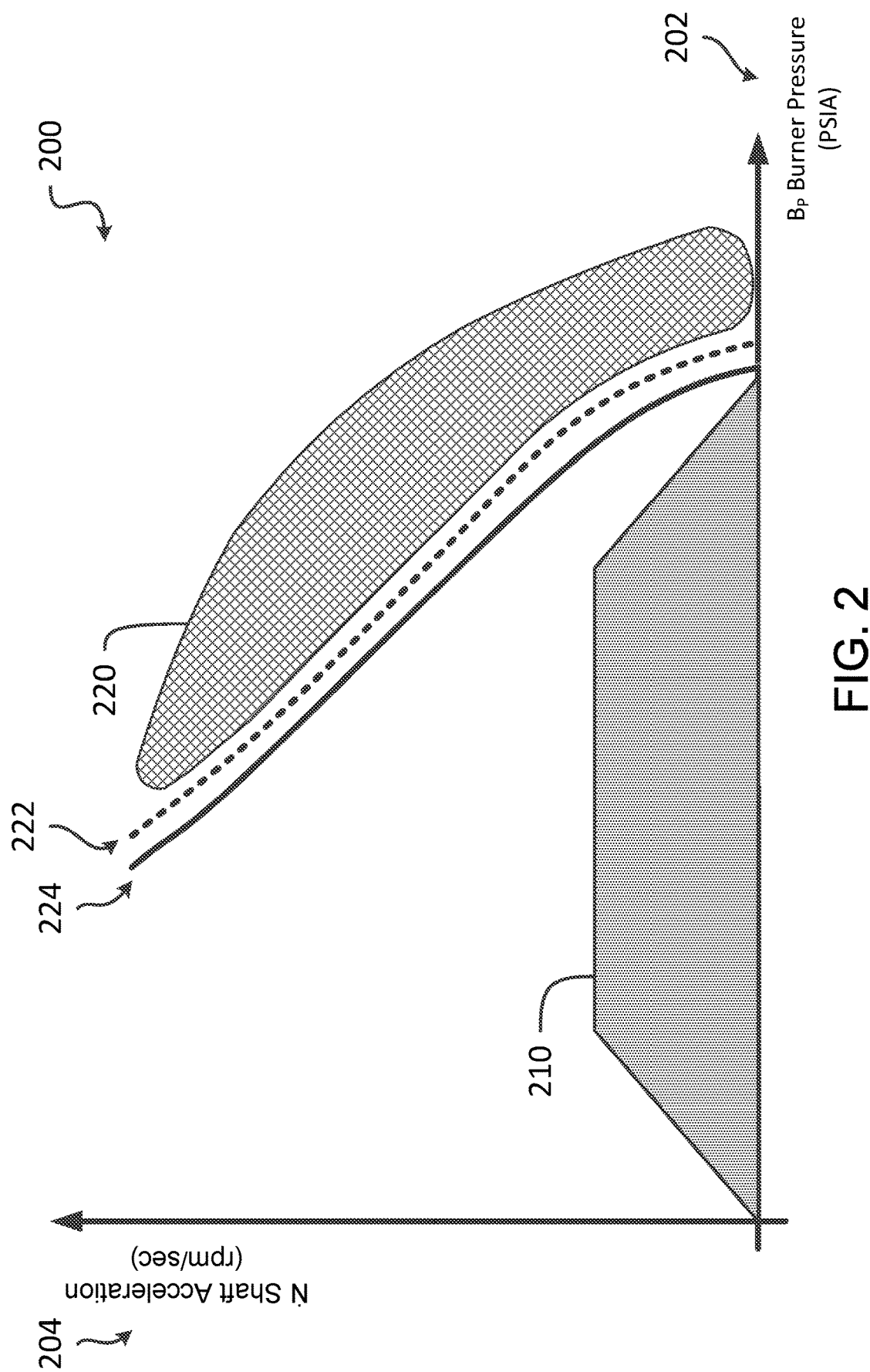
FIG. 2 is a two-dimensional graphical representation of example health schedule for the gas turbine engine of FIG. 1.

With reference to FIG. 2, there is illustrated, as a two-dimensional graphical representation, a health schedule 200 for the engine 100. The health schedule is based on two operating parameters for the engine 100: a burner pressure ($B_p$), on axis 202, and a shaft acceleration ($\dot{N}$), on axis 204. The burner pressure 202 is a measure of the pressure within a burner of the engine 100, for instance the combustor 160. The burner pressure 202 can be determined in any suitable fashion, including by measuring the burner pressure 202 using one or more of the sensors 102, or by calculating the burner pressure 202 using values collected from one or more of the sensors 102 elsewhere in the engine 100. The shaft acceleration 204 is a measure of the rate-of-change of the speed the shaft, for instance the low pressure shaft 130. The shaft acceleration 204 can be determined in any suitable fashion, including by measuring the speed of the low-pressure shaft and applying a differentiation function, or in any other suitable fashion.

The health schedule 200 defines a normal operation zone 210 and a plastic deformation zone 220. The normal operation zone 210 defines a range of values for the burner pressure 202 and the shaft acceleration 204 which are indicative of normal operation for the engine 100. The normal operation zone 210 can be defined based on experimental results, simulation results, and/or from first principles. It should be noted that the engine 100 may, under certain conditions, operate outside the normal operation zone 210, but still not be in operating parameters which may result in the low pressure shaft 130 experiencing a plastic deformation event.

The plastic deformation zone 220 denotes a range of values for the burner pressure 202 and the shaft acceleration 204 which are indicative of the occurrence, and/or the possibility of occurrence, of plastic deformation events being experienced by the low pressure shaft 130. Similarly to the normal operation zone 210, the plastic deformation zone 220 can be defined based on experimental results, simulation results, and/or from first principles. In some embodiments, the plastic deformation zone 220 is determined based on simulation results using a calibrated engine performance model for the engine 100. For instance, simulations can be performed across an operating range for the engine 100, which can be a flight envelope for an aircraft of which the engine 100 is an element. The simulations can include simulations performed at maximum fuel flow values, for instance to simulate a fuel runaway event experienced by the engine 100. It should be noted that in the embodiment of FIG. 2, the plastic deformation zone 220 is defined as consisting of operating parameters which, if experienced by the engine 100, will result in plastic deformation, for instance of the low-pressure shaft 130. However, in other embodiments, the plastic deformation zone 220 can be defined as consisting of operating parameters which may not necessarily result in the low pressure shaft 130 experiencing a plastic deformation event; that is to say, the low pressure shaft 130 will not necessarily be plastically deformed due to operation at any particular point within the plastic deformation zone 220. Rather, it should be understood that operation of the engine 100 within the plastic deformation zone 220 may result in the low pressure shaft 130 experiencing a plastic deformation event.

As a result, the health schedule 200 defines two curves: a minimum plastic deformation curve 222, and a plastic deformation warning curve 224. The minimum plastic deformation curve 222 is a limit for values for the burner pressure 202 and the shaft acceleration 204 above which a plastic deformation event for the low pressure shaft 130 occurs for a shaft having established minimum material properties, for instance based on established specifications for the low pressure shaft 130. To account for tolerances, including tolerance stack up in the measurement system, the plastic deformation warning curve 224 is defined using values for the burner pressure 202 and the shaft acceleration 204 lower than the values for the minimum plastic deformation curve 222. Put differently, the plastic deformation warning curve 224 is a more conservative limit than the minimum plastic deformation curve 222. The separation between the plastic deformation warning curve 224 and the minimum plastic deformation curve 222 can be established in any suitable fashion, for instance based on industry guidelines for warning systems, or based on values obtained through experimental or simulation testing.

The controller 105 can be provided with the health schedule 200 so that, during operation of the engine 100, the controller 105 can evaluate whether actual values for the burner pressure 202 and the shaft acceleration 204 meet or exceed the plastic deformation warning curve 224. For instance, when the controller 105 detects a fuel runaway event, the controller 105 can begin monitoring the burner pressure 202 and the shaft acceleration 204. The controller 105 can use the health schedule 200 to detect occurrences of the burner pressure 202 and the shaft acceleration 204 exceeding the plastic deformation warning curve 224, and issue an alert responsive thereto associated with a negative health state for the engine 100. In some embodiments, the alert specifies one or more aspects of the maintenance issue, including that the maintenance issue is associated with a shaft of the engine 100, for instance the low pressure shaft 130. For example, the alert can include an indication of an occurrence of a possible plastic deformation event experienced by the engine 100. In another example, the alert includes an indication that the negative health state for the engine is an unairworthiness state. Other embodiments are also considered.

It should be noted that the two-dimensional graphical representation of the health schedule 200 illustrated in FIG. 2 is only one example; the health schedule 200 can be provided as any suitable type of data structure, for instance any type of two-dimensional data structure. In addition, the controller 105 can use any suitable means for comparing the values for the burner pressure 202 and the shaft acceleration 204 against the plastic deformation warning curve 224. In some embodiments, the plastic deformation warning curve 224 is not a curve defined in a two-dimensional graphical representation, and the comparison can be performed by comparing the values for the burner pressure 202 and the shaft acceleration 204 against defined values for the plastic deformation warning curve 224. Other approaches are also considered.

It should be noted that, in some embodiments, the use of the burner pressure 202 and the shaft acceleration 204 to establish the health schedule 200 is predicated on the burner pressure 202 and the shaft acceleration 204 serving as proxy measurements for the torque experienced by the low pressure shaft 130. In this fashion, values for the burner pressure 202 and the shaft acceleration 204 can be used to assess whether the low pressure shaft 130 experienced a torque exceedance event, which could result in a plastic deformation event, without the need for additional sensor 102 being deployed to measure the torque experienced by the low pressure shaft 130. For instance, because the low pressure shaft 130 is subjected to a torque related to a static load, for instance a low-pressure compressor and fan, and because the associated inertial component is related to the fan and the acceleration of the low pressure compressor, the values for the burner pressure 202 and the shaft acceleration 204 can be used. In particular, the burner pressure 202 serves as a proxy for the static load, and the shaft acceleration 204 serves as a proxy for the inertial load.

Figure 3:
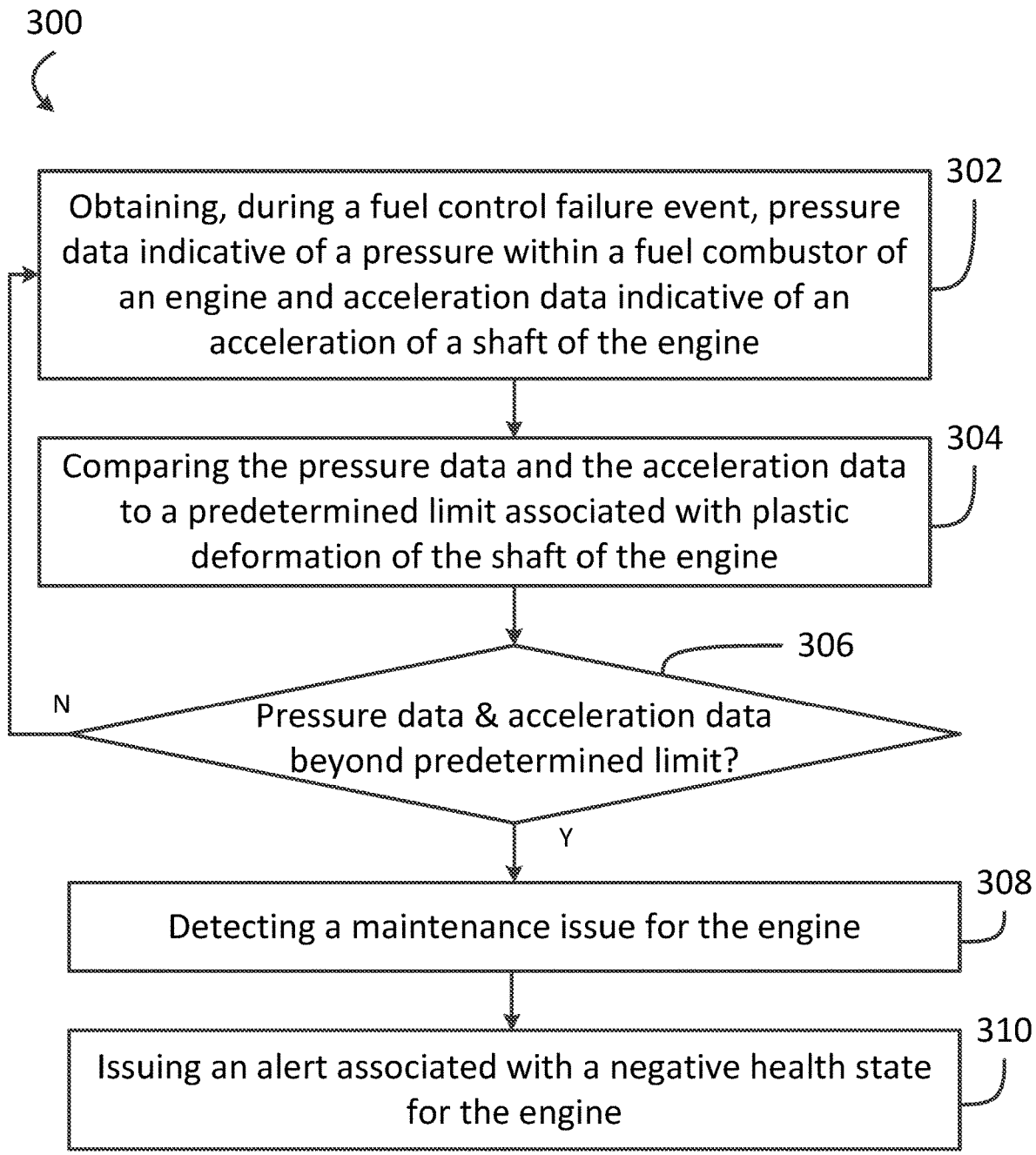
FIG. 3 is a flowchart of an example method for assessing a health state of an engine.

With reference to FIG. 3, there is illustrated a method 300 for assessing a health state of an engine, for instance the engine 100. The method 300 can be implemented, for instance, by the controller 105. At step 302, pressure data indicative of a pressure within a fuel combustor of the engine 100, for instance for the combustor 160, and acceleration data indicative of an acceleration of a shaft of the engine 100, for instance the low pressure shaft 130, is obtained during a fuel control failure event, for instance a fuel runaway event. The pressure data and the acceleration data can be measured via one or more sensors 102, derived based on other measurements acquired with one or more sensors 102, or any suitable combination thereof. In some embodiments, step 302 is performed responsive to detecting a fuel control failure event, for instance by the controller 105, which can be coupled to a fuel system for the engine 100, for instance the fuel system 106. In some other embodiments, monitoring of the pressure data and the acceleration data can be performed substantially continuously irrespective of whether the fuel control failure event is detected. Once a fuel control failure event is detected, the method 300 can commence, for instance by starting to obtain the pressure data and the acceleration data for the purposes of the following steps of the method 300.

At step 304, the pressure data and the acceleration data are compared to a predetermined limit associated with plastic deformation of the low pressure shaft 130 of the engine 100, for instance the plastic deformation warning curve 224. In some embodiments, the plastic deformation warning curve 224 is determined using simulations of a calibrated engine performance model of the engine 100.

At decision step 306, an evaluation is made regarding whether the pressure data and the acceleration data are beyond the plastic deformation warning curve 224. When the pressure data and the acceleration data are not beyond the plastic deformation warning curve 224, the method 300 returns to some previous step, for instance step 302, or a preceding step in which monitoring for a fuel control failure event is performed. When the pressure data and the acceleration data are beyond the plastic deformation warning curve 224, the method 300 moves to step 308.

At step 308, a maintenance issue for the engine 100 is detected. The maintenance issue can be detected, for example, by the controller 105.

At step 310, an alert associated with a negative health state for the engine 100 is issued. The alert can, in some embodiments, specify one or more aspects of the maintenance issue, including that the maintenance issue is associated with the low pressure shaft 130, and/or can indicate the occurrence of a possible plastic deformation event experienced by the engine 100, or that the negative health state for the engine is an unairworthiness state. In some embodiments, the alert is provided to an operator of the engine 100, or to an operator of a larger system of which the engine 100 is an element, for instance an operator of an aircraft. Alternatively, or in addition, the alert is provided to a maintenance crew or other staff responsible for performing maintenance on the engine 100.

Figure 4:
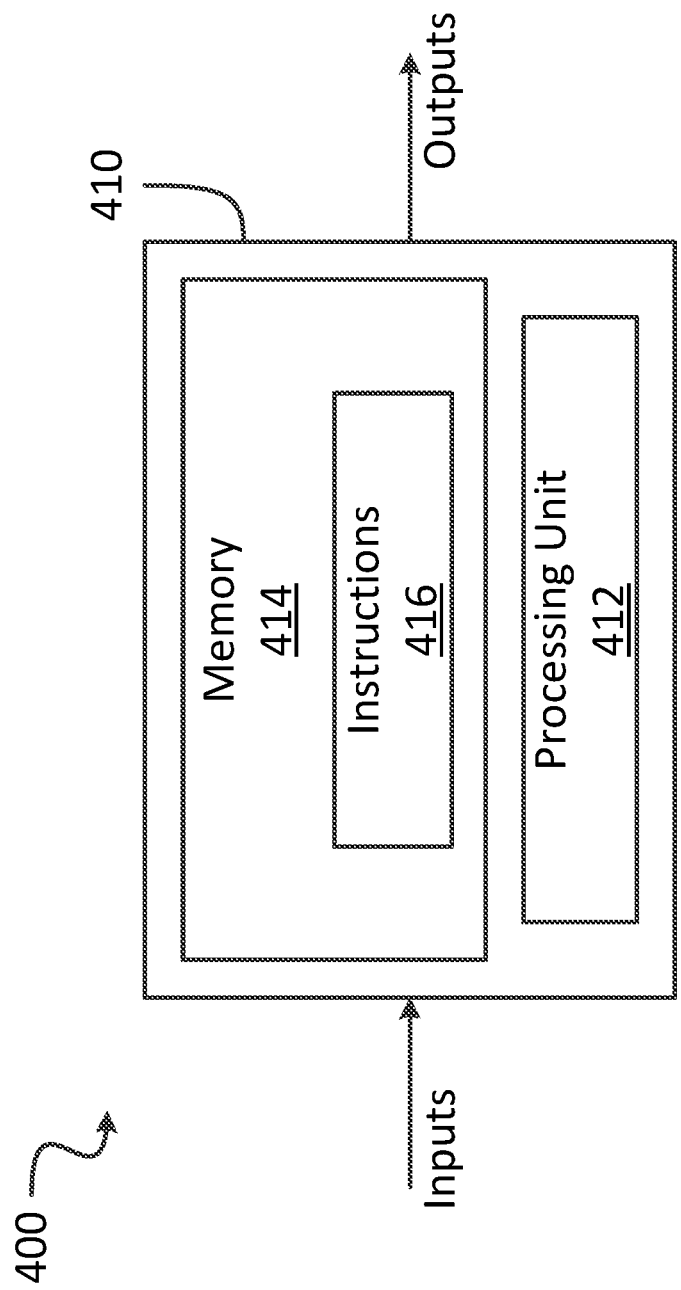
FIG. 4 is block diagram of an example computing device for implementing the method of FIG. 3.

With reference to FIG. 4, the method of FIG. 3 may be implemented by a computing device 410, as an embodiment of the controller 105. The computing device 410 comprises a processing unit 412 and a memory 414 which has stored therein computer-executable instructions 416. The processing unit 412 may comprise any suitable devices configured to implement the functionality of the controller 105 such that instructions 416, when executed by the computing device 410 or other programmable apparatus, may cause the functions/acts/steps performed by the controller 105 as part of the method 300 and as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

It should be noted that the computing device 400 may be implemented as part of a FADEC or other similar device, including an electronic engine control (EEC), engine control unit (EUC), engine electronic control system (EECS), an Aircraft Avionics System, and the like. In addition, it should be noted that the techniques described herein can be performed by a computing device 400 substantially in real-time.

The methods and systems described herein may be implemented in a high level procedural or object oriented programming or scripting language, or a combination thereof, to communicate with or assist in the operation of a computer system, for example the computing device 400. Alternatively, the methods and systems described herein may be implemented in assembly or machine language. The language may be a compiled or interpreted language. Program code for implementing the methods and systems for monitoring a temperature of a gas turbine engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for assessing a health state of an engine, comprising:
    obtaining, during a fuel control failure event experienced by the engine, pressure data indicative of a pressure within a fuel combustor of the engine and acceleration data indicative of an acceleration of a shaft of the engine;
    comparing the pressure data and acceleration data to a predetermined limit associated with plastic deformation of the shaft of the engine;
    detecting a maintenance issue for the engine when the pressure data and the acceleration data are beyond the predetermined limit; and
    issuing an alert associated with a negative health state for the engine responsive to detecting the maintenance issue.

2. The method of claim 1, wherein the predetermined limit comprises a curve defined in a two-dimensional data structure.

3. The method of claim 2, wherein comparing the pressure data and the acceleration data to a predetermined limit comprises locating the pressure data and the acceleration data in the two-dimensional data structure.

4. The method of claim 3, wherein the curve is defined a predetermined distance away from a point cloud disposed in the two-dimensional data structure, the point cloud composed of values for the pressure within a fuel combustor and for the acceleration of the shaft which result in plastic deformation of the shaft.

5. The method of claim 1, wherein the maintenance issue is associated with the shaft of the engine.

6. The method of claim 5, wherein the alert comprises an indication of an occurrence of a possible plastic deformation event for the shaft of the engine.

7. The method of claim 5, wherein the alert comprises an indication of the negative health state being an unairworthiness state.

8. The method of claim 1, comprising detecting the fuel control failure event, wherein the obtaining of the pressure data and the acceleration data is performed responsive to detecting the fuel control failure event.

9. The method of claim 1, wherein the shaft is a first one of a plurality of shafts within the engine, and wherein obtaining the acceleration data comprises obtaining shaft acceleration data for the first shaft, the first shaft being associated with the fuel compressor.

10. The method of claim 1, wherein the engine is a turbofan engine, and wherein obtaining the acceleration data comprises obtaining acceleration data for a low-pressure spool of the turbofan engine.

11. A system for assessing plastic deformation of a shaft of an engine, comprising:
    a processing unit; and
    a non-transitory computer-readable medium having stored thereon computer-readable instructions executable by the processing unit for:
    obtaining, during a fuel control failure event experienced by the engine, pressure data indicative of a pressure within a fuel combustor of the engine and acceleration data indicative of an acceleration of a shaft of the engine;
    comparing the pressure data and acceleration data to a predetermined limit associated with plastic deformation of the shaft of the engine;
    detecting a maintenance issue for the engine when the pressure data and the acceleration data are beyond the predetermined limit; and
    issuing an alert associated with a negative health state for the engine responsive to detecting the maintenance issue.

12. The system of claim 11, wherein the predetermined limit comprises a curve defined in a two-dimensional data structure.

13. The system of claim 12, wherein comparing the pressure data and the acceleration data to a predetermined limit comprises locating the pressure data and the acceleration data in the two-dimensional data structure.

14. The system of claim 13, wherein the curve is defined a predetermined distance away from a point cloud disposed in the two-dimensional data structure, the point cloud composed of values for the pressure within a fuel combustor and for the acceleration of the shaft which result in plastic deformation of the shaft.

15. The system of claim 11, wherein the maintenance issue is associated with the shaft of the engine.

16. The system of claim 15, wherein the alert comprises an indication of an occurrence of a possible plastic deformation event for the shaft of the engine.

17. The system of claim 15, wherein the alert comprises an indication of the negative health state being an unairworthiness state.

18. The system of claim 17, wherein computer-readable instructions are further executable for detecting the fuel control failure event, wherein the obtaining of the pressure data and the acceleration data is performed responsive to detecting the fuel control failure event.

19. The system of claim 11, wherein the shaft is a first one of a plurality of shafts within the engine, and wherein obtaining the acceleration data comprises obtaining shaft acceleration data for the first shaft, the shaft being associated with the fuel compressor.

20. The system of claim 11, wherein the engine is a turbofan engine, and wherein obtaining the acceleration data comprises obtaining acceleration data for a low-pressure spool of the turbofan engine.

* * * * *